Jan. 22, 1952     H. L. BENNETT     2,583,201

WHEEL LIFT FOR VEHICLE TESTING MACHINES

Filed Aug. 13, 1945

INVENTOR
HAROLD L. BENNETT
BY Reynolds & Beach
ATTORNEYS

Patented Jan. 22, 1952

2,583,201

UNITED STATES PATENT OFFICE 2,583,201

WHEEL LIFT FOR VEHICLE TESTING MACHINES

Harold L. Bennett, South Bend, Ind., assignor to Bennett-Feragen Inc., South Bend, Ind., a corporation of Washington Application August 13, 1945, Serial No. 610,551

2 Claims. (Cl. 73—123)

The present invention relates to a device for testing the power and allied characteristics of an automobile by the cradling of the driving wheels of the automobile between pairs of rolls connected to the testing device. More particularly, the present invention concerns the provisions for driving or rolling the automobile off such rolls, particularly without the necessity of providing means for locking the rolls against rotation, for, of course, they must be free to rotate during the testing operation, and while there are means known whereby upon reverse rotation of the driving wheels the rolls will automatically be locked, or roll shields will be moved into position overlying a roll (see Patent No. 2,397,461, referred to below) to afford traction for backing off, there are other occasions and installations wherein it is not practicable to back off, but the automobile must be moved forwardly off the rolls, by continuing or resuming rotation of its wheels in the same rotative sense that they were rotated during testing. The present invention is particularly applicable to such an installation as this latter, typical of which are the safety lanes often provided by municipal authorities for testing successive automobiles as to various mechanical characteristics and conditions.

The present invention is a division from my Dynamometer Roll Shield application Serial No. 451,346, filed July 17, 1942, now Patent No. 2,397,461, issued April 2, 1946, which in turn is divided from my application Serial No. 379,581, filed February 19, 1941, now Patent No. 2,428,005, issued September 30, 1947.

In such testing devices the wheel cradling rolls drive a power absorption unit, usually a hydraulic absorption dynamometer, which is suitably connected to and associated with indicating mechanism to determine the power characteristics, and related characteristics, of the automobile engine. Such a machine is disclosed in my original application, now Patent No. 2,428,005, referred to above. The driving wheels of the automobile must be so cradled in the driving rolls of the assembly that, regardless of the speed or power developed, the automobile will not climb upon nor leave the rolls. However, when a test is completed, it is desirable that the automobile be able to move backwardly or forwardly off the roll, and generally it is desirable that it move under its own power. In the safety lane installations referred to, the presence of following automobiles in line, undergoing other tests, makes it impossible to back off, and the automobile must go forwardly. It can be rolled forwardly with power off by the arrangement which will be described, but likewise, and without any locking of the rolls, it may start forwardly under its own power, and continue by inertia to move forwardly until it is clear of the rolls and upon firm footing.

The attainment of the above ends, in a simple reliable manner, by mechanism readily associated with such a dynamometer and the driving unit therefor, is the aim of the present invention.

In the accompanying drawings the invention has been shown in association with a typical dynamometer, and in a simple and typical form of execution.

Figure 1:
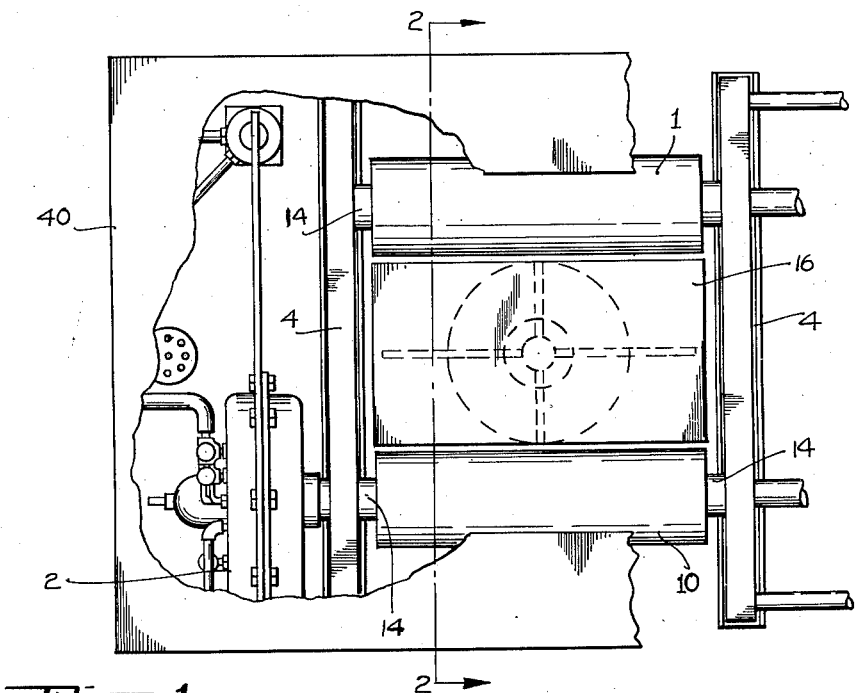
Figure 1 is a plan view, showing parts broken away, of a dynamometer and its driving rolls for cradling the driving wheel of an automobile, with the wheel traction or lifting plate associated with the rolls.

The dynamometer 2, the construction of which is shown in detail in the grandparent application, now Patent No. 2,428,005, is driven from one of a pair of rolls, of which the roll 1 may be considered the rear roll and the roll 10 the forward roll. In the present form of the invention it is immaterial which is the rear and which is the forward roll, other than for purposes of proper drive of the dynamometer 2. Each roll rotates freely on its axis in antifriction bearings, indicated at 14, supported in suitable framework, indicated by the numeral 4, and the whole is covered over, as far as is feasible, by a deck plate 40.

The paired cradle-forming rolls 1 and 10 are spaced sufficiently far apart that an automobile rear or driving wheel W can drop between them to such a degree that, so long as the forward roll 10 is reasonably free to rotate under the rotative impulse of the cradled wheel W, the wheel will be unable to climb out of the cradle thus formed. The dynamometer 2 exerts some retarding force on the roll 10, but at its maximum this is a fluid force rather than a positive resistance, and the liquid resistance offered by this roll 10, translated into tractive force at the tire of the wheel W, is never sufficient to enable the automobile to drive out under its own power, and because the lift from the wheel's position at the bottom of the cradle to the top of the roll 10 is rather high, neither is it feasible to push and roll the automobile forward. With automobiles that incorporate torque converter drives or clutches, the liquidity of these transmission means imposes an additional obstacle, similar in kind to the dynamometer's liquidity in resisting rotation of the roll 10, to driving out of the cradle under power, and this would hold true for such fluid transmissions even if the roll 10 were to be positively locked against rotation when the time arrives for the automobile to be driven off. Necessarily in the latter instance, and desirably even with a positively-connected drive to the wheel 10 from the automobile's engine, the wheel W should be elevated about to or somewhat above the level of the top of the roll 10, and afforded a generally level tractive surface of sufficient area that it can initiate forward movement of the automobile, and give it sufficient momentum to roll past the "dead spot" such as is constituted by the roll 10, before it reaches the stable footing of the runway or deck plate 40.

Figure 2:
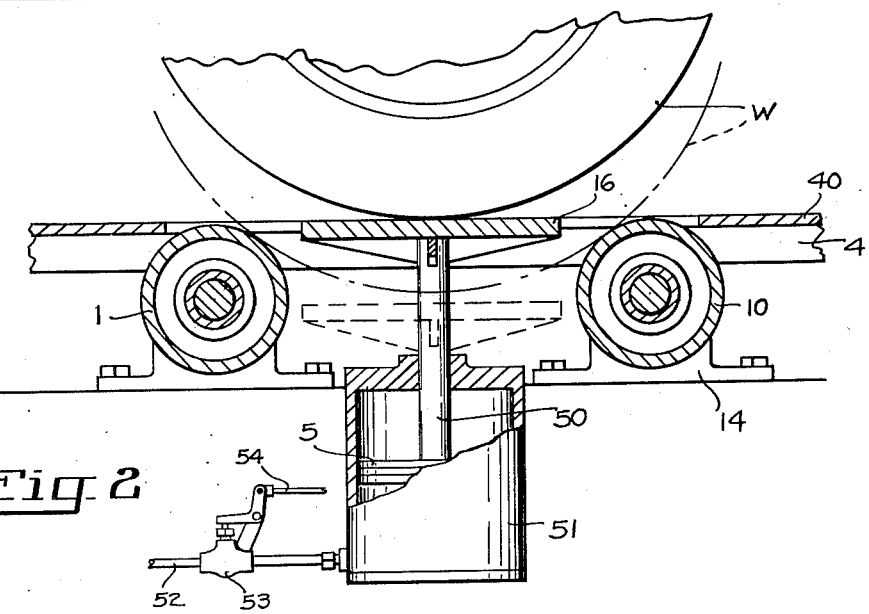
Figure 2 is transverse section substantially along the line 2—2 of Figure 1.

Between the paired rolls 1 and 10 is supported a plate or platform 16, and this platform is supported upon a jack structure operatively connected with it. For example, the platform 16 is supported upon the upper end of a piston rod 50, connected to a piston 5 within a cylinder 51. Thus the platform may be directly lifted from a lowered inoperative position, shown in dash lines in Figure 2, wherein it is out of contact with the wheel W cradled between the rolls 1 and 10, to an operative position, shown in full lines in Figure 2, wherein the platform 16 is at a level not materially lower than, but which may be somewhat above, the level of the uppermost portions of the rolls 1 and 10. To control the elevator a pressure fluid, as oil, is supplied from any suitable source by way of the pipe 52 past a valve 53 which can be operated, by mechanism illustrated at 54, from any convenient spot. For that matter, the control may be automatic, to be initiated, for instance, by reverse movement of the rolls under control of the wheels in the event the vehicle is intended to back off. Overrunning clutches and similar devices, which might be employed to this end, are illustrated in the parent Patent No. 2,428,005.

The vehicle may be driven or rolled on to the rolls 1 and 10; whether it be first rolled onto platform 16 and then lowered into cradled position, or be rolled immediately into the cradled position is immaterial. Then the test commences, with the platform 16 at such a low level that it is out of contact with and has no effect upon the rotation of the wheel. The test concluded, the platform is lifted by supplying pressure fluid beneath the piston 5, and when the wheel W has reached a proper elevation, it may be driven off the platform, or it may be rolled off. In either event the momentum acquired by starting the vehicle will persist, and the vehicle will not roll back as it rolls off the roll 1 or 10, even though this may tend to rotate backwardly as the wheel rolls over it. When the wheel reaches the solid deck 40, it may be rolled or driven away at will.

The ability to roll the vehicle off by pushing it is particularly advantageous during certain testing operations, if, for example, the distributor head of the engine has been removed.

The hydraulic jack illustrated is merely typical of any form of jack means which may be employed to lift the platform 16, for as is obvious, air might be used to lift the platform, or a mechanical or electrical device, or even a screw jack, may replace the hydraulic jack shown.

There are two short rolls 1 and 10 illustrated, long enough to serve a single runway and the driving wheel at one side of an automobile, and the platform 16 is of corresponding length. Normally the rolls and platform would be duplicated at the opposite side of the automobile, to accommodate the drive wheel at this opposite side, or the rolls and the platform (either or both) may be made long enough to receive simultaneously both the driving wheels of an automobile. Such matters concern design considerations only, hence where in this specification and in the claims reference is made to a single pair of rolls and a single platform, such duplication or extension in length is intended to be implied, as circumstances or design considerations may require.

It is desirable to emphasize that the platform and its operating mechanism are wholly independent of the rolls, and have no connection to the latter. Disposition of the platform in either limit position, or for that matter in any position whatsoever, does not in any way retard or prevent (nor facilitate) rotation of either roll. Except as other mechanism may be provided to stop, lock, or retard the rolls, or as the dynamometer's internal resistance may be varied, the rolls are as free to rotate while the platform is elevated to the full line level of Figure 2 as they were when the platform was lowered to its dash line position. No such additional mechanism or retardation of the rolls is required in order that the mechanism of this invention may function, nor will their provision assist in, nor for that matter obstruct, its functioning. If any such additional mechanism or retardation of the rolls be provided, the same would be wholly immaterial to the need for and the functioning of the apparatus of this invention. This invention accomplishes the purpose of elevating the previously cradled driving wheels of the automobile to a level where it will not have to climb over the still freely rotative wheel 10, under its own power or while being pushed, and of affording a tractive surface for the driven wheel whereby, under its own power, it can give the automobile sufficient initial momentum that the driving wheel will roll over and past the roll 10 onto solid footing at 40 beyond, notwithstanding any tendency for the roll to rotate as the wheel rolls over its top.

I claim as my invention:

1. In combination with an automobile driving test runway having a wheel receiving opening therein, substantially freely rotatable wheel cradling rolls spaced apart in said opening and located substantially wholly below the runway level, a wheel lift platform adapted to be located in wheel-engaging alignment with said runway, and guided for vertical reciprocation in the space between said rolls, between lowered position out of contact with an automobile wheel cradled on the rolls, and a raised position in such alignment with the runway, and elevated sufficiently to engage the wheel from below and to assume substantially the entire wheel load from the rolls, and serving in such elevated position as a continuation of the runway, to enable self-powered movement of the automobile from over the wheel opening and across the intervening roll onto the runway, and means operable so to reciprocate said lift platform.

2. In combination with an automobile driving test runway having a wheel-receiving opening therein, two spaced wheel-cradling rolls rotationally supported in said opening with their upper peripheral surfaces approximately at the runway level and located in the vicinity of the forward and rearward edges respectively of said opening, a wheel lift platform operatively guided for vertical reciprocation in the space between said rolls in said opening, between lowered position out of contact with a wheel cradled on the rolls, and raised position elevated substantially to the level of the runway, to enable self-powered movement of the automobile from over the wheel opening, and means operable so to reciprocate said lift platform; the test runway, the upper periphery of the rolls, and the wheel lift platform being arranged in alignment to present a substantially continuous driving platform surface when the platform is in its elevated position.

HAROLD L. BENNETT.

REFERENCES CITED

The following references are of record in the file of this patent:

UNITED STATES PATENTS

| Number | Name | Date |
|---|---|---|
| 1,184,159 | Becker | May 23, 1916 |
| 1,804,041 | Tilden | May 5, 1931 |
| 2,074,372 | Cunningham | Mar. 23, 1937 |
| 2,160,092 | Smally | May 30, 1939 |